United States Patent
Aphek

(10) Patent No.: US 10,175,101 B2
(45) Date of Patent: Jan. 8, 2019

(54) METHODS AND SYSTEMS FOR FLASH DETECTION

(71) Applicant: ELTA SYSTEMS LTD., Ashdod (IL)

(72) Inventor: Ori Aphek, Ramat Gan (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 14/976,215

(22) Filed: Dec. 21, 2015

(65) Prior Publication Data

US 2016/0178433 A1 Jun. 23, 2016

(30) Foreign Application Priority Data

Dec. 21, 2014 (IL) .......................................... 236364

(51) Int. Cl.
| | |
|---|---|
| *G01J 5/00* | (2006.01) |
| *G01J 1/42* | (2006.01) |
| *G01J 1/44* | (2006.01) |
| *G01J 1/16* | (2006.01) |
| *G01J 3/02* | (2006.01) |
| *G01J 3/28* | (2006.01) |
| *G01J 3/36* | (2006.01) |
| *G01J 1/02* | (2006.01) |
| *F41G 3/14* | (2006.01) |
| *G01S 3/784* | (2006.01) |

(52) U.S. Cl.
CPC ............ *G01J 1/4228* (2013.01); *F41G 3/147* (2013.01); *G01J 1/0266* (2013.01); *G01J 1/1626* (2013.01); *G01J 1/44* (2013.01); *G01J 3/0205* (2013.01); *G01J 3/0208* (2013.01); *G01J 3/0216* (2013.01); *G01J 3/0289* (2013.01); *G01J 3/2803* (2013.01); *G01J 3/2823* (2013.01); *G01J 3/36* (2013.01); *G01S 3/784* (2013.01); *G01J 2003/2826* (2013.01)

(58) Field of Classification Search
CPC ...... G01J 3/2803; G01J 3/0289; G01J 3/2823; G01J 1/0266; G01J 1/1626; G01J 1/4228; G01J 1/44; G01J 2003/2826; G01J 3/0205; G01J 3/0208; G01J 3/0216; G01J 3/36; F41G 3/147
USPC ...................................................... 250/338.1
See application file for complete search history.

(56) References Cited

U.S. PATENT DOCUMENTS

| | | | | |
|---|---|---|---|---|
| 4,603,255 A | * | 7/1986 | Henry .................... | G08B 17/12 250/339.05 |
| 4,701,624 A | * | 10/1987 | Kern ...................... | G08B 17/12 250/227.23 |

(Continued)

FOREIGN PATENT DOCUMENTS

| | | |
|---|---|---|
| EP | 2 533 008 A1 | 12/2012 |
| WO | 2008/100097 A1 | 8/2008 |

(Continued)

*Primary Examiner* — Taeho Jo
(74) *Attorney, Agent, or Firm* — Oliff PLC

(57) ABSTRACT

The present disclosure provides an optical system suitable for detecting muzzle flashes in a scene, the optical system comprising: a first optical module customized for detecting flashes at short range of the optical system by analyzing irradiance received on a first infrared sensor; a second optical module customized for detecting flashes at long range of the optical system by analyzing irradiance received on a second infrared sensor; wherein: the first and second optical modules are configured to share a common field of view and to operate independently of each other.

19 Claims, 5 Drawing Sheets

(56) References Cited

U.S. PATENT DOCUMENTS

| | | | | |
|---|---|---|---|---|
| 5,015,844 A * | 5/1991 | Cole | ............ | G01S 3/784 |
| | | | | 250/227.24 |
| 5,596,509 A * | 1/1997 | Karr | ............ | F41J 5/10 |
| | | | | 235/411 |
| 5,686,889 A * | 11/1997 | Hillis | ............ | F41G 3/147 |
| | | | | 250/330 |
| 6,792,369 B2 * | 9/2004 | Messina | ............ | G01B 11/272 |
| | | | | 702/94 |
| 7,420,195 B2 * | 9/2008 | Cerwin | ............ | G01N 21/71 |
| | | | | 250/214.1 |
| 7,499,836 B1 * | 3/2009 | Mooney | ............ | G01J 3/02 |
| | | | | 356/303 |
| 7,619,754 B2 | 11/2009 | Riel et al. | | |
| 7,899,644 B2 * | 3/2011 | Weber | ............ | F41H 11/02 |
| | | | | 340/945 |
| 8,304,729 B2 | 11/2012 | Snider et al. | | |
| 8,421,015 B1 | 4/2013 | Scott et al. | | |
| 8,642,961 B2 * | 2/2014 | Snider | ............ | G06K 9/00771 |
| | | | | 250/336.1 |
| 9,063,012 B2 * | 6/2015 | Thorne | ............ | G01J 1/44 |
| 2002/0030163 A1 * | 3/2002 | Zhang | ............ | G02B 23/125 |
| | | | | 250/330 |
| 2003/0174315 A1 * | 9/2003 | Byren | ............ | F41G 3/326 |
| | | | | 356/152.1 |
| 2004/0030519 A1 * | 2/2004 | Messina | ............ | G01B 11/272 |
| | | | | 702/94 |
| 2006/0021498 A1 * | 2/2006 | Moroz | ............ | F41G 3/147 |
| | | | | 89/41.06 |
| 2006/0285201 A1 * | 12/2006 | Bryant | ............ | G02B 13/14 |
| | | | | 359/353 |
| 2007/0106482 A1 * | 5/2007 | Zandifar | ............ | G09G 3/2092 |
| | | | | 702/85 |
| 2007/0125951 A1 * | 6/2007 | Snider | ............ | G06K 9/00771 |
| | | | | 250/363.03 |
| 2008/0191926 A1 * | 8/2008 | Benayahu | ............ | F41H 7/00 |
| | | | | 342/52 |
| 2008/0208514 A1 * | 8/2008 | Weber | ............ | F41H 11/02 |
| | | | | 702/134 |
| 2008/0260236 A9 * | 10/2008 | Ishikawa | ............ | G01N 21/95607 |
| | | | | 382/149 |
| 2009/0179144 A1 * | 7/2009 | Fine | ............ | H04N 5/2254 |
| | | | | 250/234 |
| 2010/0027840 A1 * | 2/2010 | Roberts | ............ | G06T 5/002 |
| | | | | 382/103 |
| 2010/0128109 A1 * | 5/2010 | Banks | ............ | G01S 7/4816 |
| | | | | 348/46 |
| 2010/0208244 A1 * | 8/2010 | Earhart | ............ | G01S 3/7867 |
| | | | | 356/139.01 |
| 2011/0095187 A1 * | 4/2011 | Snider | ............ | G06K 9/00771 |
| | | | | 250/336.1 |
| 2011/0170798 A1 * | 7/2011 | Tidhar | ............ | G01J 3/2803 |
| | | | | 382/276 |
| 2011/0285667 A1 * | 11/2011 | Poupyrev | ............ | G06F 3/045 |
| | | | | 345/174 |
| 2011/0303846 A1 * | 12/2011 | Thorne | ............ | G01J 1/44 |
| | | | | 250/332 |
| 2012/0001071 A1 * | 1/2012 | Snider | ............ | G06K 9/00771 |
| | | | | 250/336.1 |
| 2012/0242864 A1 * | 9/2012 | Pauli | ............ | F41G 3/147 |
| | | | | 348/236 |
| 2013/0021468 A1 * | 1/2013 | Mefford | ............ | G01J 1/0425 |
| | | | | 348/135 |
| 2013/0088594 A1 * | 4/2013 | Wyles | ............ | H04N 5/343 |
| | | | | 348/144 |
| 2013/0343602 A1 * | 12/2013 | Snider | ............ | G06K 9/00771 |
| | | | | 382/103 |
| 2014/0022393 A1 * | 1/2014 | Cole | ............ | H04N 5/33 |
| | | | | 348/164 |
| 2014/0184806 A1 * | 7/2014 | Tidhar | ............ | G01J 3/2803 |
| | | | | 348/164 |
| 2014/0312209 A1 * | 10/2014 | Nemirovsky | ............ | G01J 1/4228 |
| | | | | 250/208.2 |
| 2015/0138534 A1 * | 5/2015 | Tidhar | ............ | F41G 3/147 |
| | | | | 356/51 |
| 2015/0304612 A1 * | 10/2015 | Richards | ............ | H04N 5/33 |
| | | | | 348/159 |
| 2016/0069743 A1 * | 3/2016 | McQuilkin | ............ | G01J 3/2803 |
| | | | | 356/416 |

FOREIGN PATENT DOCUMENTS

| | | |
|---|---|---|
| WO | 2009/093227 A1 | 7/2009 |
| WO | 2013/108253 A1 | 7/2013 |
| WO | 2013/160901 A2 | 10/2013 |

* cited by examiner

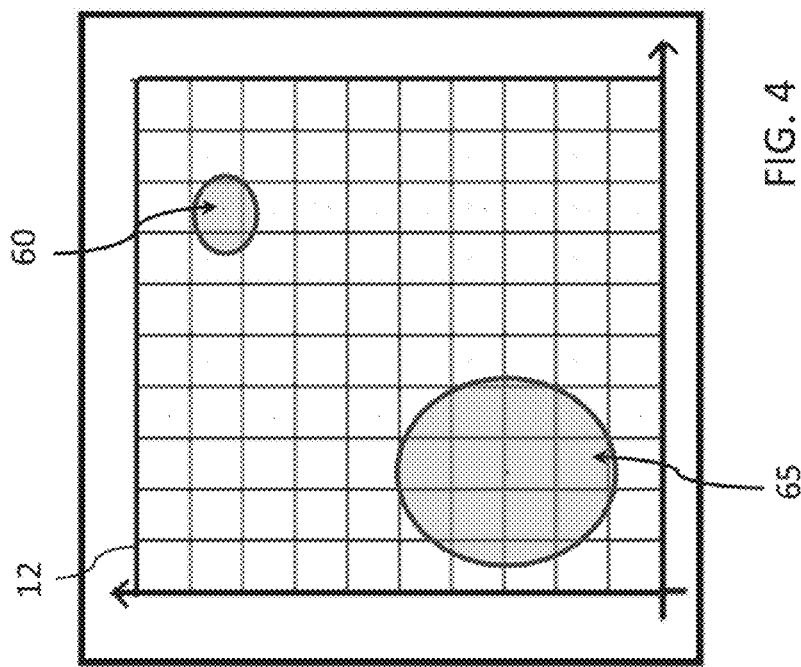
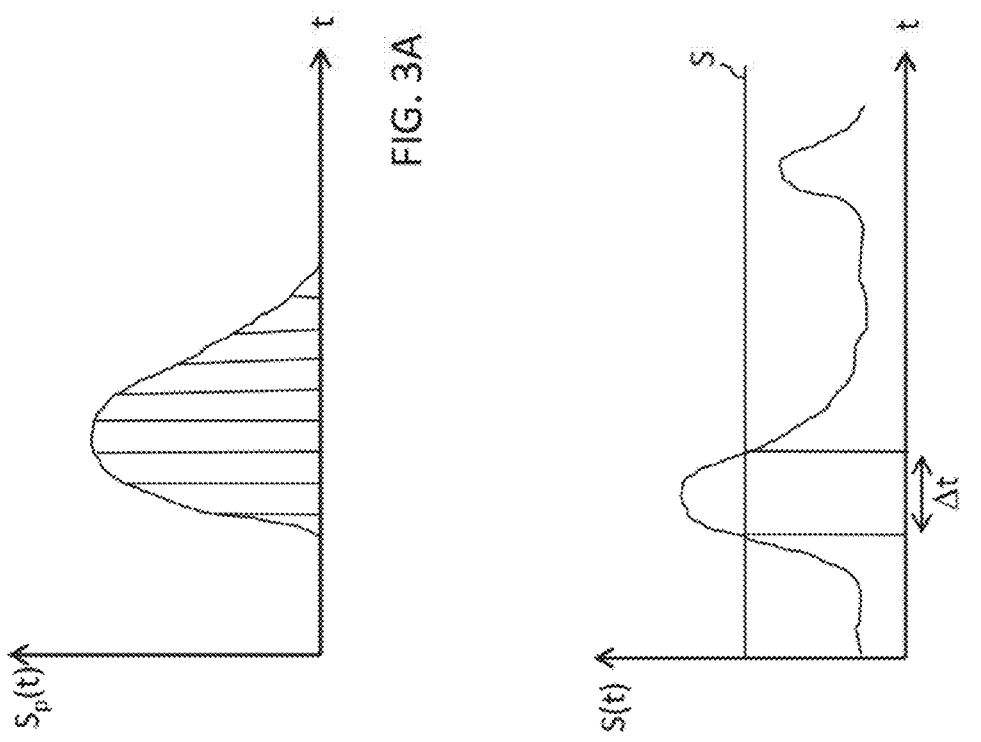

METHODS AND SYSTEMS FOR FLASH DETECTION

TECHNOLOGICAL FIELD

The present disclosure relates generally to the field of flash detection. More particularly, the present disclosure relates to methods and systems suitable for muzzle flash and detonation detection.

BACKGROUND

Weapon firing events create optical flashes known as muzzle flashes. Muzzle flashes are incandescent flashes at the weapons muzzle caused by the ignition, the expulsion of burning powder grains and the expansion of powder gasses.

Various techniques have been developed to detect flashes. For example, optical techniques involving spectral or multi-spectral imaging have been proposed. These techniques are generally implemented by an optical system involving a focal plane array (FPA) with tens of thousands of pixels in order to limit a background influence on flash detection. Furthermore, since muzzle flashes are generally short duration events, a read out rate (sampling rate) of the focal plane array needs to be driven at high frequencies. This results in high data rates from the focal plane array and raises challenges with respect to computational and cooling requirements of such detection equipment. These challenges are even more severe when the readout rate of the focal plane array is further increased to enable analysis of temporal features of the muzzle flashes.

GENERAL DESCRIPTION

The Applicant has found that it is possible to alleviate the abovementioned problem by providing a combined optical system which combines a first optical module configured for detecting flashes at a short range with a second optical module configured for detecting flashes at a long range. Since background influence is relatively reduced at short range because an optical power of a flash received at the optical system is higher, the Applicant hereby proposes to design the first optical module with a first infrared sensor which involves significantly less pixels (i.e. a significantly higher Instantaneous Field Of View) than an infrared sensor of the second optical module. Accordingly, the first infrared detector can be read with an increased sampling rate and thereby provides, at least at short range, with improved capabilities such as temporal features matching without the above mentioned shortcuts.

Therefore, the present disclosure provides an optical system suitable for detecting muzzle flashes in a scene, the optical system comprising: a first optical module customized for detecting flashes at short range of the optical system by analyzing irradiance received on a first infrared sensor; a second optical module customized for detecting flashes at long range of the optical system by analyzing irradiance received on a second infrared sensor; wherein the first and second optical modules are configured to share a common field of view.

The first and second optical modules may be configured to operate independently of each other.

In some embodiments, the first and second optical modules are configured so that a first maximum detection distance at which a predetermined flash is sensed by the first infrared sensor with a predetermined marginal signal to noise ratio is significantly inferior to a second maximum detection distance at which the predetermined flash is sensed by the second infrared sensor with the predetermined marginal signal to noise ratio.

In some embodiments, the first and second optical modules are configured so that the first maximum detection distance is superior to a minimum detection distance of the second optical module at which the predetermined flash saturates the second infrared sensor.

In some embodiments, an instantaneous field of view of the first optical sensor is significantly superior to an instantaneous field of view of the second optical sensor.

In some embodiments, a sampling rate of the first infrared sensor is significantly superior to a sampling rate of the second infrared sensor.

In some embodiments, the first and second optical modules are configured so that the first and second optical modules exclusively operate concurrently.

In some embodiments, the first and second optical modules both output detection results to an output module.

In some embodiments, the output module is configured to: discard the detection results of the second module for flash detection when the second infrared sensor is saturated by a flash occurring at short range of the optical system; discard the detection results of the first module for flash detection when the signal to noise ratio of a signal produced by the first infrared sensor in response to a flash occurring at long range of the optical system is below a predetermined threshold; and combine the detection results of the first and second modules for flash detection when a flash occurs at an overlapping range of detection of the first and second module so that a signal to noise ratio of the first module is above the predetermined threshold and the second infrared sensor is not saturated.

In some embodiments, a sampling ratio between a sampling rate of the first infrared sensor and a sampling rate of the second infrared sensor is superior to about 5.

In some embodiments, a pixel ratio between an instantaneous field of view of the first optical sensor and an instantaneous field of view of the second optical sensor is superior to about 10.

In some embodiments, a ratio between the sampling ratio and the pixel ratio is kept between 5 and 500.

In some embodiments, the first and/or second optical modules are configured for detecting flashes using one or more power threshold detection algorithms.

In some embodiments, the one or more power threshold detection algorithms comprise either an absolute threshold detection or a adaptive average threshold detection.

In some embodiments, the first optical module is configured for detecting flashes using one or more temporal pattern matching algorithm.

In some embodiments, the one or more temporal pattern matching algorithms comprise correlating pre-stored target patterns to a signal produced by the first infrared sensor in response to infrared illumination.

In some embodiments, the one or more temporal pattern matching algorithms comprise detecting a pulse shape in a signal produced by the first infrared sensor in response to infrared illumination and comparing a length of the detected pulse shape with a predetermined pulse length range.

In some embodiments, the first optical module and/or the second optical module are further configured to provide multi-spectral sensing of the common field of view and wherein said first and/or second optical modules are configured for detecting flashes using one or more spectral ratio algorithms.

In some embodiments, the one or more spectral ratio algorithms comprise comparing an irradiance distribution received from one or more portions of the common field of view in several wavebands with pre-stored target irradiance distributions.

In some embodiments, the one or more spectral ratio algorithms comprise a pattern analysis of a variation of a spectral distribution over time.

In some embodiments, the first infrared sensor and/or the second infrared sensor comprise a focal plane array and said first and/or second optical modules are configured for discarding flashes based on a spatial extent of a flash on the focal plane array.

In some embodiments, wherein the second optical module is configured to discard flashes spanning over more than a predetermined number of adjacent pixels of the focal plane array.

In some embodiments, the first infrared sensor is a first focal plane array and the first optical module further comprises first imaging optics to form an image on the first focal plane array of the common field of view.

In some embodiments, the second infrared sensor is a second focal plane array and the second optical module further comprises second imaging optics to form an image on the second focal plane array of the common field of view.

In some embodiments, the second infrared sensor comprises a two dimensional array of isolated sensors arranged in an insect eye configuration wherein each said sensor is associated with a collecting non imaging optics.

In some embodiments, the first infrared sensor comprises a single infrared photodetector covering the common field of view.

In some embodiments, the first and/or the second infrared sensors are sensitive in a wavelength band within the shortwave infrared waveband between 1 and 2.5 microns.

In some embodiments, the first infrared sensor comprises a readout circuit configured for reading a current produced by the infrared sensor in response to infrared illumination.

In some embodiments, the output module is further configured to localize a detected flash in the scene.

In some embodiments, the output module is configured to determine a direction of the detected flash with respect to a line of sight of the optical system.

In some embodiments, when the second infrared sensor is saturated and a flash is detected by the first infrared sensor, determining a direction of the detected flash is based on a position of one or more saturated pixels on the second infrared sensor.

The Applicant has also found that the proposed combined optical system can advantageously provide an increased dynamic range with respect to state of the art systems. Indeed, as explained above, state of the art systems generally include focal plane arrays with tens of thousands of pixels in order to achieve a satisfactory accuracy in the angular positioning at long range and to avoid clutter effects from background. Such focal plane arrays encounter low saturation levels because a size of a pixel on these FPA is constrained and the size of the pixel consequently limits a capacitance of a readout circuit configured for reading a current produced in response to infrared illumination. Therefore, state of the art systems are generally saturated by flashes which occur at short range. Because the first optical module of the proposed combined optical system may operate at a higher sampling rate and the pixel size can be increased since said system may include an infrared sensor which involves substantially less pixels than the FPA of state of the art systems, the saturation level can accordingly be increased. This may enable to detect short range flashes or very powerful flashes which would otherwise saturate the detection system.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 3A-3B are graphs illustrating flash detection algorithm based on temporal features matching which may be implemented by an optical system according to embodiments of the present disclosure.

FIG. 4 illustrates a flash detection algorithm based on spatial extent of a spot in an image plane which may be implemented by an optical system according to embodiments of the present disclosure.

DETAILED DESCRIPTION OF EMBODIMENTS

Figure 1:
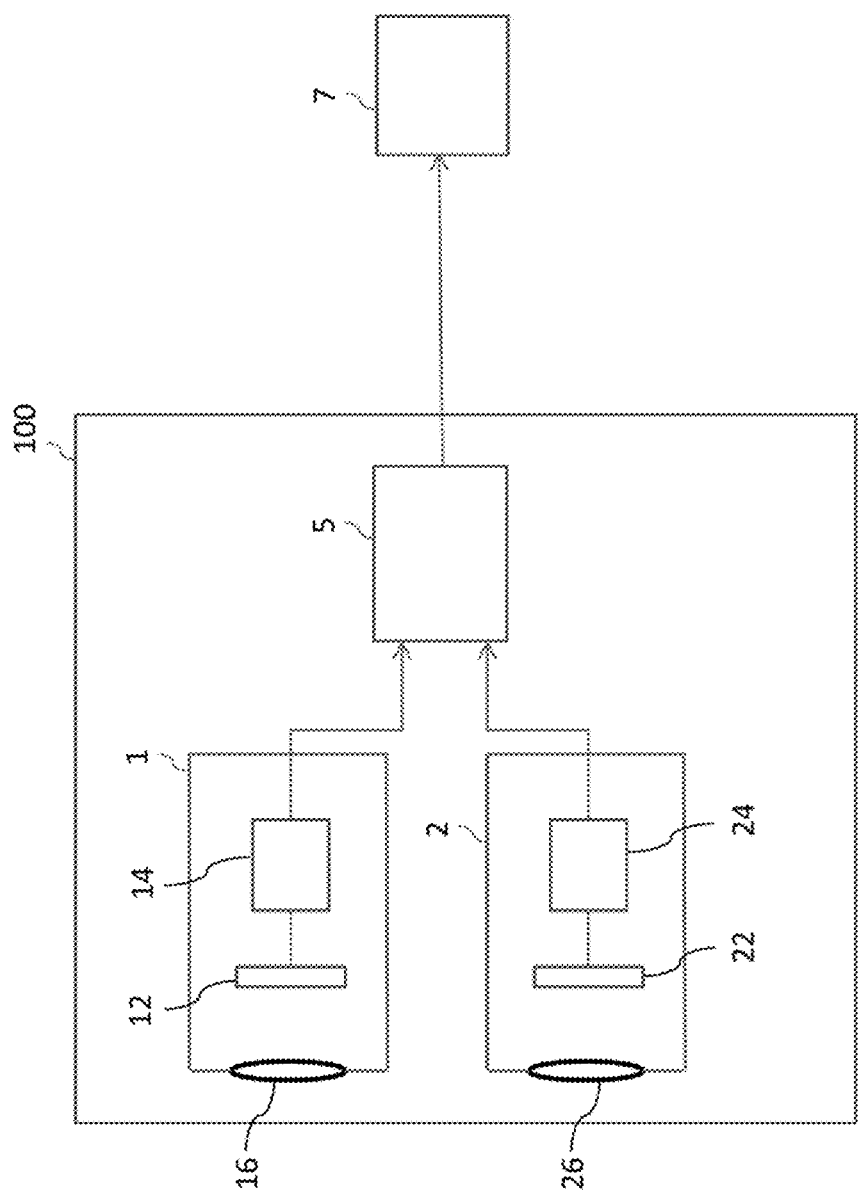
FIG. 1 is a functional block diagram illustrating an optical system according to embodiments of the present disclosure.

Described herein are some examples of systems and methods for analyzing a scene and detecting muzzle-flashes and detonations, i.e. fire events.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

As apparent from the following discussions, it is appreciated that throughout the specification discussions utilizing terms such as "generating", "determining", "providing", "receiving", "using", "transmitting", "performing", "forming", "analyzing", "outputting" or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

In the following, an optical system combining a short range (first) optical module and a long range (second) optical module is described. The first and second optical modules may be configured so that the first and second optical modules operate in parallel (exclusively concurrently). In other words, the first and second optical modules are configured to operate jointly i.e. one of the first and second optical modules cannot operate (or stop) if the other does not operate (or stop). It is noted that the present description assumes that a field of view (FOV) of the optical system is set. The FOV of the optical system may be adapted for observation of a wide scene both vertically and horizontally. The FOV can be expressed as the product of a vertical field of view by a horizontal field of view. For example the set FOV may be 60×90 degrees or 50×120. Thus, as explained below, the long range and short range requirements can be translated into FOV and IFOV requirements. Furthermore, the first and second optical modules may be spatially and temporally registered to enable cooperation between the first and second modules. In some embodiments, detection results from the first and second optical modules may be fused so as to provide long and short range detection results.

It is understood that the term infrared sensor in the following refers to one or more infrared detectors (for example arranged as a focal plane array) together with a readout circuit configured to read a current produced by illumination of the detector(s). As explained, a readout circuit of a focal plane array involving a high number of pixels has a limited capacitance notably because of space limitations. Accordingly, such "long range" focal plane arrays have a minimum detection distance which is higher than "short range" focal plane arrays involving a few pixels over a similar active surface.

The second optical module may be adapted for detecting long range flashes i.e. be designed so as to provide a maximum detection range above a predetermined long range threshold. The predetermined long range threshold may be comprised between 2 km and 20 km, for example 7 km. The term maximum detection range may be used to refer to a distance at which a predetermined type of flash (for example with a radiant intensity of 500 or 300 Watts per steradians) transmitted in predetermined standard conditions (for example a typical clear day i.e. atmospheric transmission of about 0.8 or 0.85 per kilometer) is detected with a marginal signal to noise ration (for example 6). The term "long range" module may more generally refer to a module having a maximum detection distance which is beyond a maximum detection distance of a "short range" module.

The second optical module may include a focal plane array (second infrared sensor) and collecting optics for focusing light at an image plan where the focal plane array is positioned. The focal plane array may be provided with a readout circuit to read a current produced by the FPA in response to infrared illumination. The FPA may include a high number of pixels, typically in the order of tens of thousands or more per steradian of field of view. Consequently, because of data rates limitations, a sampling rate of the focal plane array may be limited and may typically be in the range of 100 Hz to 1000 Hz.

A maximum detection distance of the focal plane array may be determined as the maximum distance for which a signal to noise ratio (SNR) is above the predetermined marginal signal to noise ratio for a predetermined flash. The signal to noise ratio may be calculated as follows:

$$SNR = \frac{N_t}{\sqrt{N_{Total} + b^2}}$$

Wherein:

$N_t$ represents a charge accumulated by a pixel of the FPA receiving a flash, $N_{Total}$ represents a total charge accumulated by the pixel, and b represents a constant electronic noise.

$$N_{Total} = N_t + N_d + N_b$$

Wherein:

$N_d$ represents a charge accumulated because of dark currents, and $N_b$ represents a charge accumulated because of background power.

It is noted that $N_b$ and $N_d$ do not vary with a distance between the flash and the optical system.

The charge $N_t$ accumulated by a pixel receiving a flash can be determined as follows:

$$N_t = P_{tar} * R_n * FPS * \frac{1}{e}$$

Wherein:

$P_{tar}$ represents an optical power received at the sensor from the flash,

Rn represents a responsivity of the infrared sensor,

FPS represents a sampling rate (frame/readout rate) of the readout circuit, and e represents an energy unit of 1 electron volt.

Further, the optical power received at the sensor can be expressed as follows:

$$P_{tar} = J * t_{atm}^{(R/1000)/R^2} * A_{opt} * t_{opt}$$

Wherein:

J represents a radiant intensity of the predetermined flash, $t_{atm}$ represents an atmospheric transmission in predetermined conditions, R represents a distance between the flash and the optical system, $A_{opt}$ represents a clear optical aperture area of the collecting optics, and $t_{opt}$ represents a transmission of optical power through the collecting optics The clear optical aperture area of the collecting optics being linked to the amount of pixels and to the pixel pitch as follows:

$$A_{opt} = \left[ \frac{N_h * p_d}{2 * F^\#} * \tan\frac{FOV}{2} \right]^2$$

Wherein:

$N_h$ represents an amount of pixel in one dimension (horizontal or vertical), $p_d$ represents a pixel pitch between the center of each pixel, FOV represents a vertical or horizontal field of view, $F^\#$ represents a focal number of the collecting optics.

Therefore, it is possible to customize the second optical module to detect long range flashes i.e. to have a high maximum detection distance by notably providing a focal plane array with a high amount of pixels.

Furthermore, the second infrared sensor of the second optical module may generally be configured to sense at least Short Wavelength Infrared radiations i.e. between 1.0-2.5 microns. In some embodiments, the second optical module may be provided with multi-spectral capabilities. For example, images may be acquired simultaneously in the SWIR band and in a visible band.

The second optical module may additionally be provided with signal processing means for real time detection of muzzle flashes. The signal processing means (processing module) may include a fast data channel such as HDMI or USB3 channels, a multi-core processor and high speed memory such as DDR3 memory.

A minimum detection distance of the focal plane array may be determined as the maximum distance at which a predetermined flash transmitted in predetermined conditions causes a pixel charge to reach a saturation pixel charge i.e. at a distance from the optical system superior to the minimum detection distance the saturation does not occur. As explained in more details below, saturation is dominantly caused by the readout circuit associated with the focal plane array.

The readout circuit of the focal plane array may integrate a current flowing from each photo-diode over the exposure time in a capacitor for each pixel. The accumulated charge $N_{total}$ may determine a voltage change across the capacitor. However, since the voltage change in the capacitor has a maximum limit after which the readout circuit saturates, the accumulated has also a maximum limit which can be expressed as follows:

$$N_{max} = V_{max} * C$$

Wherein:

$N_{max}$ represents the maximum limit of a charge accumulated by a pixel, $V_{max}$ represents a saturation voltage of the readout circuit, and C represents a capacitance of the readout circuit.

Moreover, a capacitor of a readout circuit of a pixel is proportional to the size of the pixel of the FPA. It can be evaluated that the size of such capacitor is around 25% of the size of a pixel. This leads for typical CMOS process capacitors to a maximal capacitance of around 225 fF.

Therefore, a maximum limit of a charge accumulated by a pixel can be determined and lead to a maximum power at sensor that the second optical module can receive before saturation for a set sampling rate. This enables to derive a minimum detection distance for the second optical module. This is because saturation prevents the system from estimating the total and the time-dependent radiation of the flash, which is required for distinguishing between a legitimate flash and other events that may occur within the FOV such as sun-glints.

The first optical module may be adapted for detecting short range flashes. In particular, the first optical module may be customized so that a maximum detection distance of the first optical module exceeds the minimum detection of the second optical module. The maximum detection distance of the first optical module may be customized so that a predetermined overlap occurs between the first and second optical modules detection ranges. The overlap may for example be of about 300 to 1000 m for the 500 or 300 Watts per steradians mentioned above. The minimum range of the first optical module may be of example 20m, which corresponds to the minimum firing range of relevant threats. This enables to provide an optical system covering an increased dynamic range, which enables it to avoid saturation and therefore be effective for detection of threats from range as close as 20 m and as far as several kilometers. Furthermore, the first and second optical modules may be configured to cover a common field of view and an instantaneous field of view of the first optical module may be significantly superior to an instantaneous field of view of the second optical module. In some embodiments, the first infrared sensor may be a focal plane array with significantly less pixels than the focal plane array of the second optical module. The first optical sensor may comprise a low number of infrared detectors, typically between 1 to a few hundreds per steradian of field of view and preferably between 4 to 100. This allows for a sampling rate of the first infrared sensor (first sampling rate) to be significantly superior to a sampling rate of the second infrared sensor (second sampling rate) because the data rate amounts to a product of the number of pixels by the sampling rate. The first sampling rate may be adapted for enabling determining muzzle flash temporal features which are typically known to be in the scale of 0.05 ms. For example, the first sampling rate may be in the range of 10 kHz and above. Consequently, because the sampling rate of the first infrared sensor is high and a limitation on a capacitance of a readout circuit of the first infrared sensor is waived, the minimum detection distance of the first optical module can be very low.

Furthermore, the first optical sensor of the first optical module may be configured to sense SWIR radiations in the range of 1.0 to 2.5 microns, particularly between 1.4 and 2.5 microns. The Applicant has found that even though sensing such SWIR radiations do not provide an optimal sensitivity, the first optical module provides an enhanced efficiency by using SWIR photodetector. Particularly, the Applicant has found that time of response of the optical system is improved. Further, using SWIR detectors limit the warming of the sensor at high sampling rates and enable to increase the sampling rate of the first infrared sensor. Eventually, since SWIR detectors do not require extra cooling, the resulting optical system is less complex to manufacture and manipulate.

FIG. 1 illustrates generally a functional diagram of an optical system 100 combining a first optical module 1 and a second optical module 2 according to embodiments of the present disclosure. The optical system 100 may comprise an output electronic module 5 configured to output combined detection results to a display module 7. The first and second optical modules 1, 2 may operate simultaneously. The first and second optical modules 1, 2 may be configured to operate independently of each other. The first and second optical modules 1, 2 may be configured to operate in parallel.

The first optical module 1 may be specially configured to detect short range flashes as explained above so that a maximum detection distance of the first optical module 1 exceeds a minimum detection distance of the second optical module 2. The first optical module 1 may comprise a first infrared sensor 12, first collecting optics 16 and a first electronic module 14.

The first infrared sensor 12 may include one or more photodetectors (also referred to as single IFOV or multiple IFOVs) configured to produce a current in response to infrared radiations in a predetermined infrared band. Particularly, the first infrared sensor may include between 1 and a few hundreds photodetectors. The predetermined infrared band may preferably belong to the SWIR band i.e. between 1.0 and 2.5 microns, particularly between 1.4 and 2.5 microns. The first infrared sensor may be provided with a spectral filter (not shown) to filter out radiations which do not belong to the predetermined infrared band. The spectral filter may be positioned either upstream or downstream of the collecting optics. The terms "upstream" and "downstream" are understood herein with reference to a propagation direction of light i.e. the filter can be mounted either before the collecting optics such that light is propagated through the filter on its way to the collecting optics or after the collecting optics so that the light is propagated through the collecting optics on its way to the spectral filter. The first infrared sensor 12 may comprise a first readout circuit (not shown) configured for reading a current produced by infrared illumination of the first infrared sensor 12. The first readout circuit may be configured to integrate a current flowing from each photodetector over a predetermined exposure time in a capacitor. A sampling rate of the first readout circuit may be very high without creating bottleneck data rates because of the relatively small number of photodetectors. For example, a sampling rate of the first readout circuit may exceed 10 MHz.

The first collecting optics 16 may either be imaging optics or non-imaging optics. In some embodiments, the first infrared sensor may be a single IFOV and the first collecting optics may be non imaging optics such as a Compound Parabolic Concentrator (CPC) or a dielectric totally internally reflecting concentrator (DTIRC). In some embodiments, the first infrared sensor may be either a single IFOV or a multiple IFOVs and the collecting optics may be imaging optics. In some embodiments, the first infrared sensor may be an array of single IFOV sensors arranged in an insect-eye configuration and the collecting optics may be non-imaging optics for transferring light on each of the single IFOV. In these embodiments, the sensors may not share the same collecting optics and each pixel may have its own CPC or DTIRC collecting non-imaging optics The first electronic module 14 may be configured to receive a signal output by the readout circuit. The electronic module 14 may comprise an amplifier and an analog to digital converter (ADC) to which the signal output by the readout circuit is sequentially provided. The first electronic module 14 may further comprise a processing unit configured for receiving a signal output by the ADC and for running one or more detection algorithms to detect flashes. In some embodiments in which the first infrared sensor comprises a focal plane array and the collecting optics are imaging optics, a position of a pixel in the image plane of the collecting optics may enable to provide a direction of a detected flash with respect to a line of sight of the optical system. The first electronic module 14 may be configured to run any one or more of power threshold algorithms, temporal pattern matching algorithms, spatial extent algorithms and spectral evaluation algorithms.

Figure 2A:
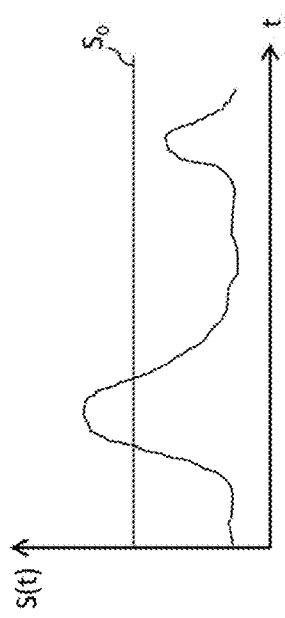
FIGS. 2A-2C are graphs illustrating power based flash detection algorithms which may be implemented by an optical system according to embodiments of the present disclosure.
Figure 2B:
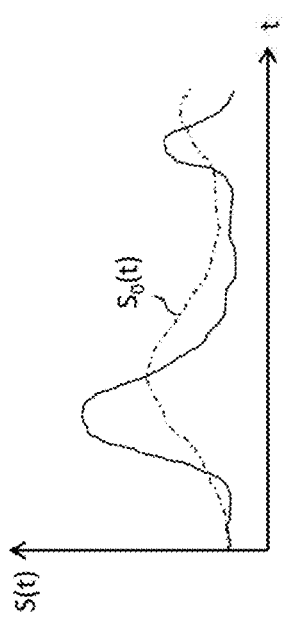
Figure 2C:
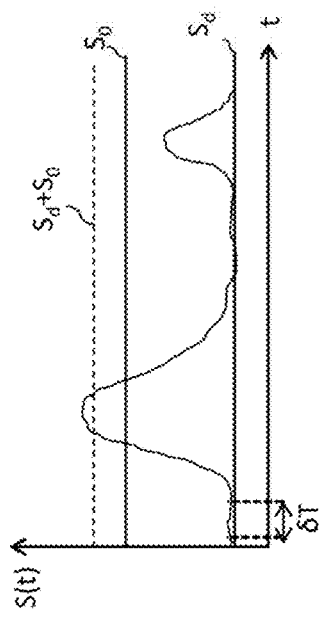

FIGS. 2A-2C illustrate several power threshold detection algorithms which may be run by the first electronic module 14. FIG. 2A illustrates a standard power threshold detection algorithm: a flash is detected when the signal exceeds a constant threshold $s_0$. FIG. 2B illustrates a more advanced power threshold algorithm which involves computing an average adaptive threshold $s_0(t)$. A flash is detected when the signal exceeds the adaptive threshold $s_0(t)$. FIG. 2C illustrates another embodiment of a power threshold detection algorithm which involves measuring dark offsets $s_d$ during a blank period $\delta T$ and thereafter determining if the signal exceeds the sum of $s_d$ and $s_0$ or $s_0(t)$.

FIGS. 3A-3B illustrate a temporal pattern matching algorithm which may be run by the first electronic module 14. More particularly, FIG. 3A illustrates a target pattern $S_p(t)$ preliminarily stored as a series of samples and FIG. 3B illustrates a signal S(t) provided to the first electronic module 14. A set of target patterns may be pre-stored as a pattern library in a memory of the electronic module. In some embodiments, the temporal pattern matching algorithm may involve correlating the signal S(t) with the pattern library and determining if a correlation satisfies an eligibility threshold. In some embodiments, the temporal pattern matching algorithm involves non linear dependence measure to associate a flash event and a stored version. In some other embodiments, the temporal pattern matching algorithm may involve determining a pulse length $\Delta t$ based on a constant, adaptive or offset power threshold s as discussed above and comparing the pulse length with a pre-stored pulse length library. Because of the high sampling rate of the first readout circuit, the temporal pattern matching algorithm may be efficiently implemented.

FIG. 4 illustrates a spatial extent detection algorithm which may be run by the first electronic module 14. Spatial extent detection algorithm may be used in embodiments in which the first optical module comprises a focal plane array and imaging collecting optics. As shown on FIG. 4, infrared radiations may be focused on the focal plane array 12 so as to form a first spot 60 and a second spot 65. Spatial extent area algorithm aims at disqualifying false alarms whose spatial extent on the focal plane array does not match with a typical flash spatial extent. For example, spatial extent area algorithm may disqualify a detected flash if the detected flash spans over more than 4 adjacent pixels arranged as a square. This enables to efficiently reduce false alarms. Indeed, a flash is generally a sub-pixel event, which means that it accounts for a part of the IFOV. This means that the IFOV collects the collective radiation from the flash and the clutter. In some case, the flash radiation may split between adjacent IFOVs. A signal which appears on more adjacent IFOVs is usually not a flash, unless it is very close to the sensor so that the size of the flash is bigger than the IFOV, or very intense and thus causing internal sensor phenomena such as blooming which cause the signal to appear in IFOVs which are not supposed to collect radiation from that flash.

Referring again to FIG. 1, the second optical module 2 of the optical system 100 may be configured to detect long range flashes as explained above so that a maximum detection distance of the second optical module 2 significantly exceeds the maximum detection distance of the first optical module 1. The second optical module 2 may comprise collecting optics 26, a second infrared sensor 22 and a second electronic module 24. The collecting optics 26 may be imaging optics and the second infrared sensor 22 may comprise a focal plane array arranged at an image plane of the collecting optics 26. As explained above, the focal plane array of the second optical module may comprise tens of thousands of pixels and may be provided with a second readout circuit configured to read the current produced by each pixel of the focal plane array. A sampling rate of the second readout circuit may be limited because of the high number of pixels of the second focal plane array in order to avoid creating bottlenecks because of overly high data rates. The second sampling rate of the second readout circuit may be of about 100 Hz to 1000 Hz. The second electronic module 24 may also comprise an amplifier, a ADC and a signal processor to which a signal output from the second readout circuit may be provided sequentially. The second electronic module 24 may be configured to perform flash detection algorithms as described above i.e. power threshold detection algorithms, temporal pattern matching algorithms and/or spatial extent algorithms. However, since the sampling rate of the second readout circuit is relatively low, temporal pattern matching algorithms may not be as efficient as in the short range optical module.

The detection results from the first and second electronic modules may be provided to the electronic output module 5. In fact, part or all of the operations performed by the first and second electronic modules 14, 24 may alternatively be performed by the electronic output module 5. Additionally, the output module 5 may combine the detection results from the first and second optical modules 1, 2. Therefore, the first and second optical modules 1, 2 may cooperate to improve an accuracy of a direction measurement of an event detected by the first optical module 1. Indeed, in embodiments in which the first optical module 1 comprises an array of photodetectors, it is possible to determine a direction of short range flashes with respect to a line of sight of the optical system. However, the first optical module 1 only contains few pixels and therefore an accuracy of such position measurement may be poor. In particular for a flash detection task, the output module 5 may be configured to discard the detection results of the second optical module when the second optical module is saturated and to discard the detection results of the first optical module when a signal to noise ratio provided by the first optical module is below a predetermined threshold. Indeed, when the flash occurs at a long range, it may be too weak for the first optical module to detect it. However, the high pixel count of the second optical module enables to filter out the clutter and detect the flash. Further, when the flash occurs at a short range, the pixel or pixels of the second optical module which corresponds to the direction towards the flash may be saturated by the high intensity radiation from the flash, which prohibits it to determine that the flash is a legitimate target (although it is a candidate because it has a significantly higher radiation intensity than the clutter). However, the first optical module may not be saturated, and in short range its signal to clutter may be high enough to enable detection. In a flash localization task, the precise direction of the flash can be obtained using the high-pixel count second optical module. Indeed, the flash direction may be obtained from the saturated pixels, by relying on the assumption that a saturated pixel or a cluster (group) of saturated pixels, which were saturated simultaneously with the event detected by the first optical module, corresponds to the same legitimate flash event that was detected by the first optical module. In other words, in some embodiments, the optical system may be configured such that when the second infrared sensor is saturated and a flash is detected by the first infrared sensor, determining a direction of the detected flash is based on the position of one or more saturated pixels on the second infrared sensor. In these embodiments, the detection results from the second module are discarded in a task of detecting a presence of a short range flash (flash detection task) but participate in a task of localizing said short range flash (flash localization task). In addition, when a flash occurs in a common part of the dynamic ranges of both the first and second optical modules, both optical sensors may participate in the flash detection phase (task), while the improved direction accuracy may be obtained by the high pixel count second optical module. In this case where both sensors participate in the detection phase, the output module 5 may use the data from both sensors, which may differ in at least one of sampling rate, resolution and spectrum, to achieve a better decision than what it could achieve if only one sensor was used.

The combined results, which may provide data about the detected flash and direction towards the detected flash may be displayed by the display unit 7 which may be configured to output a flash detection and/or a flash direction, for example as an indication on a screen display.

Figure 5:
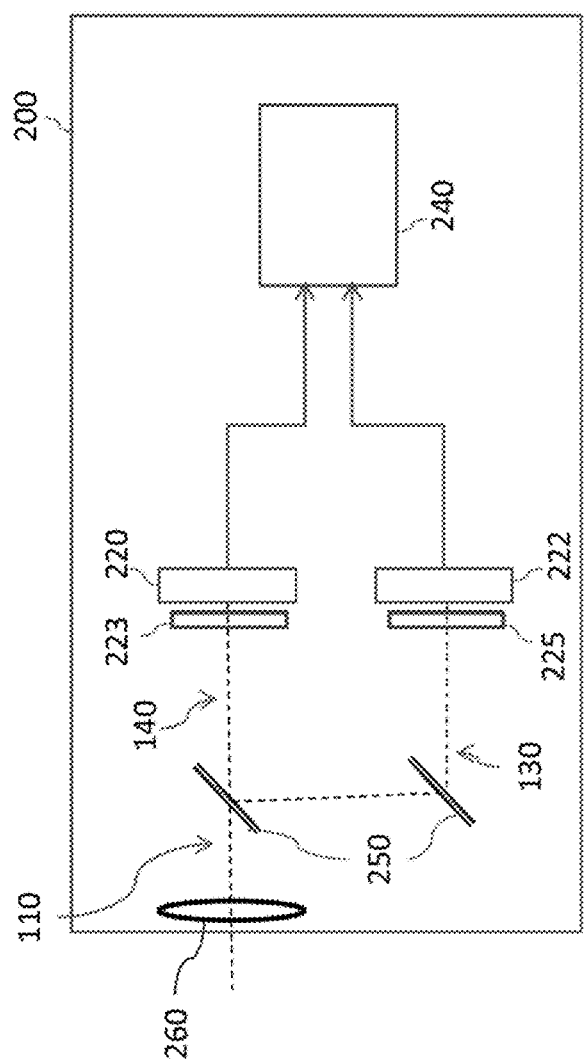
FIG. 5 is a functional block diagram illustrating an optical module according to embodiments of the present disclosure.
Figure 6:
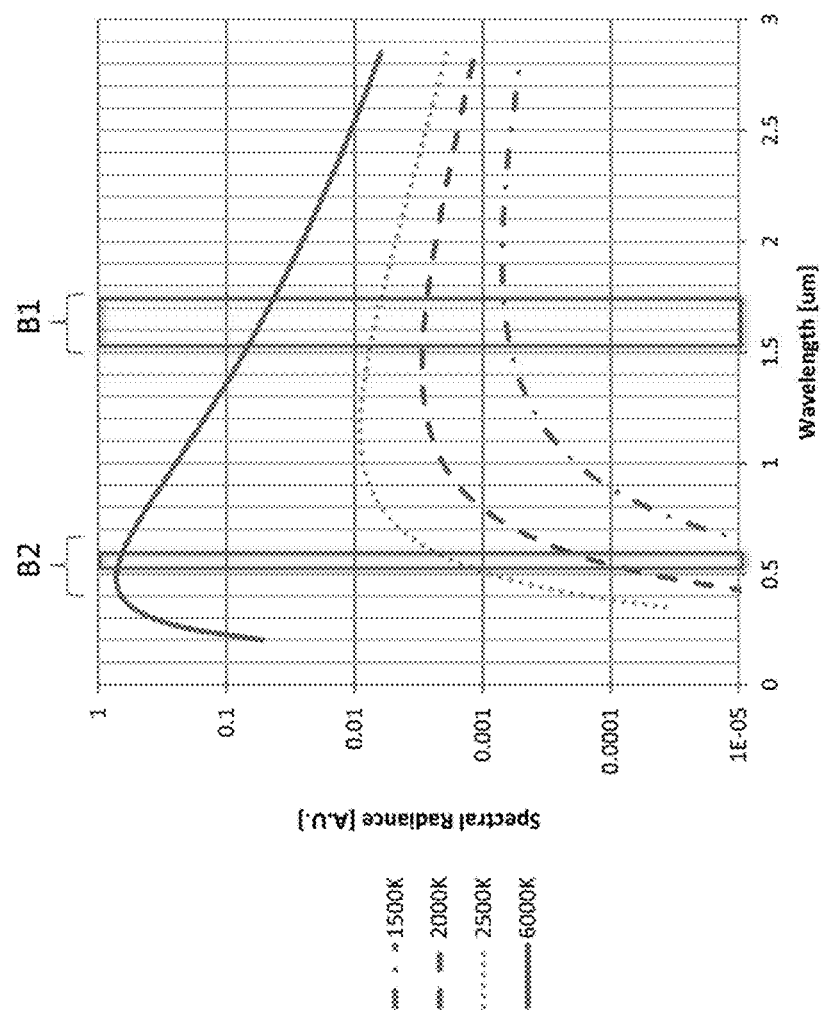
FIG. 6 illustrates a flash detection algorithm based on spectral evaluation which may be implemented by an optical system according to embodiments of the present disclosure.

Referring now to FIGS. 5 and 6 which relate to multispectral capability, it is noted that in some embodiments, a first and/or a second module of the optical system may be configured as a dual band detection/imaging system and employ a SWIR band and a visible band to distinguish between optical radiance sources within a scene which are likely to be active (e.g. hot) blackbody (or grey body) emitters with effective temperature in the range of 1200K-2500K (muzzle flashes) from other optical sources.

FIG. 5 illustrate a dual-band module 200 configured to provide dual band imaging of a scene. In some embodiments of the present disclosure, the dual-band module 200 can replace either the long range or the short range optical module described hereinabove.

The dual-band module 200 may have has a folded optical configuration and is configured to enable simultaneous acquisition of a common scene in two separate spectral band, for example a visible band, and a SWIR band. The dual-band module 200 comprises a common channel 110, a first channel 130 and a second channel 140. The common channel 111 may comprise a common optics 260 and a beam splitter arrangement 250 configured for splitting the common channel 110 into the first and second channels 130, 140. In some embodiments, the beam splitter arrangement 112 may comprise a dichroic mirror and a standard mirror. The common optic 260 may be used as a single aperture for acquiring images in both spectral bands. The first and second channels 130, 140 may be configured for respectively acquiring the images on the long wavelength band and on the short wavelength band.

The first and second channels 130, 140 may respectively include a visible focal plane array 220 and a SWIR focal plane array 222. The visible and SWIR focal plane arrays 220, 222 may be spatially registered. Therefore, each source area within a field of view of the dual band optical system may be associated with a visible pixel irradiance collected on a pixel of the visible focal plane array (FPA) of the visible channel and a SWIR pixel irradiance collected on a corresponding pixel of a SWIR focal plane array of the SWIR focal plane array (FPA). It is noted that the term "corresponding pixels" refers to respective pixels from the visible and SWIR focal plane array (FPA)s which image an identical area of a scene when the dual band module is operated i.e. used to image a scene. The first and second channels 130, 140 may further respectively comprise a visible and SWIR spectral filters 223, 225 arranged upstream of the visible and SWIR focal plane arrays 220, 222.

The visible and SWIR focal plane arrays 220, 222 may be respectively provided with readout circuits which provide detection signals to a dual band electronic module 240. The dual band electronic module 240 may be configured to perform flash detection algorithms as described above i.e. power threshold detection algorithms, temporal pattern matching algorithms and/or spatial extent algorithms. Additionally, the dual band electronic module may be configured to perform spectral ratio detection algorithms. Spectral ratio detection algorithm may be particularly efficient for detecting false alarms. In some embodiments, spectral ration algorithm may involve comparing intensities in the images acquired in both spectral bands. Indeed, it is submitted that muzzle flashes can be efficiently detected using dual band imaging by detecting whether a ratio between the irradiance collected in the long wavelength band and the irradiance change collected in the short wavelength band for a corresponding area of the dual band images meets a predefined threshold. Indeed, the Applicant has found that muzzle flashes may be modeled as black or grey-body emitters with an effective temperature of around 1200K-2500K which have extremely low emission in the short wavelength band. FIG. 6 illustrates approximately Planck curves for a temperature of 6000K which is characteristic of direct sun illumination and for temperatures of 1500K, 2000K and 2500K which have been found to be characteristic of muzzle flash events. As can be seen in FIG. 6, muzzle flashes can be distinguished from direct illumination by analyzing a spectral irradiance distribution because a ratio between the irradiance collected in the long wavelength band B1 and the irradiance collected in the short wavelength band B2 for muzzle flash and detonation events is particularly large, typically greater than 20, and thereby characteristic (distinctive) of muzzle flashes. In some embodiments, the optical system may be configured such that B1 covers between 1.5 and 1.7 microns.

Furthermore, spectral ratio algorithms may involve comparing an irradiance distribution received from one or more portions of the common field of view in several wavebands with pre-stored target irradiance distributions. Additionally, spectral ratio algorithms may involve a pattern analysis of a variation of a spectral distribution over time. A dual or multi spectral flash detection architecture favors sensor which do not saturate. This is because a saturated sensor does not provide a quantitative assessment of the radiation intensity (only a minimum value thereof), and therefore the spectral ratio of the flash in the two bands cannot be calculated. This may prevent the system from distinguishing between a legitimate flash and a sun-glint, which can be differentiated by their spectral ratio and/or by their variation of a spectral distribution over time. Therefore, the need to solve the saturation issue in dual or multi spectral high-pixel count is further enhanced, which increases the importance of a first optical module as proposed here.

For the sake of conciseness, it is noted that an unfolded configuration including two collection optics is not illustrated but is also encompassed by the present disclosure. Furthermore, it is noted that the beam splitter may be optional in a configuration including a sandwich detector i.e. wherein the visible and SWIR focal plane arrays are superimposed.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. An optical system suitable for detecting muzzle flashes in a scene, the optical system comprising:
   a first optical module customized for detecting flashes at short range of the optical system by analyzing irradiance received on a first infrared sensor;
   a second optical module customized for detecting flashes at long range of the optical system by analyzing irradiance received on a second infrared sensor;
   wherein:
   the first and second optical modules are configured to share a common field of view, and
   the first and second optical modules are configured so that a first maximum detection distance at which a predetermined flash is sensed by the first infrared sensor with a predetermined marginal signal to noise ratio is superior to a minimum detection distance of the second optical module at which the predetermined flash saturates the second infrared sensor so that a predetermined overlap occurs between first and second optical modules detection ranges,
   wherein the optical system is configured to:
   detect a flash at a short range based on detection results of the first optical module,
   detect a flash at long range based on detection results of the second optical module, and
   detect a flash at the predetermined overlap based on detection results of both the first and second optical modules.

2. The optical system according to claim 1, wherein the first and second optical modules are configured so that the first maximum detection distance at which the predetermined flash is sensed by the first infrared sensor with the predetermined marginal signal to noise ratio is significantly inferior to a second maximum detection distance at which the predetermined flash is sensed by the second infrared sensor with the predetermined marginal signal to noise ratio.

3. The optical system according to claim 1, wherein an instantaneous field of view of the first optical sensor is significantly superior to an instantaneous field of view of the second optical sensor.

4. The optical system according to claim 1, wherein a sampling rate of the first infrared sensor is significantly superior to a sampling rate of the second infrared sensor.

5. The optical system according to claim 1, wherein the first and second optical modules are configured so that the first and second optical modules exclusively operate concurrently.

6. The optical system according to claim 1, wherein the first and second optical modules both output detection results to an output module.

7. The optical system according to claim 6, wherein the output module is configured to:
- discard the detection results of the second module for flash detection when the second infrared sensor is saturated by a flash occurring at short range of the optical system;
- discard the detection results of the first module for flash detection when the signal to noise ratio of a signal produced by the first infrared sensor in response to a flash occurring at long range of the optical system is below a predetermined threshold; and
- combine the detection results of the first and second modules for flash detection when a flash occurs at an overlapping range of detection of the first and second module so that a signal to noise ratio of the first module is above the predetermined threshold and the second infrared sensor is not saturated.

8. The optical system according to claim 1, wherein the first and/or second optical modules are configured for detecting flashes using one or more power threshold detection algorithms.

9. The optical system according to claim 8, wherein the one or more power threshold detection algorithms comprises either an absolute threshold detection or a adaptive average threshold detection.

10. The optical system according to claim 1, wherein the first optical module is configured for detecting flashes using one or more temporal pattern matching algorithm.

11. The optical system according to claim 10, wherein the one or more temporal pattern matching algorithms comprise correlating pre-stored target patterns to a signal produced by the first infrared sensor in response to infrared illumination.

12. The optical system according to claim 10, wherein the one or more temporal pattern matching algorithms comprise detecting a pulse shape in a signal produced by the first infrared sensor in response to infrared illumination and comparing a length of the detected pulse shape with a predetermined pulse length range.

13. The optical system according to claim 1, the first optical module and/or the second optical module are further configured to provide multi-spectral sensing of the common field of view and wherein said first and/or second optical modules are configured for detecting flashes using one or more spectral ratio algorithms.

14. The optical system according to claim 13, wherein the one or more spectral ratio algorithms comprise comparing an irradiance distribution received from one or more portions of the common field of view in several wavebands with pre-stored target irradiance distributions.

15. The optical system according to claim 1, the first infrared sensor and/or the second infrared sensor comprising a focal plane array and wherein said first and/or second optical modules are configured for discarding flashes based on a spatial extent of a flash on the focal plane array.

16. The optical system according to claim 15, wherein the second optical module is configured to discard flashes spanning over more than a predetermined number of adjacent pixels of the focal plane array.

17. The optical system according to claim 1, wherein the first infrared sensor is a first focal plane array and the first optical module further comprises first imaging optics to form an image on the first focal plane array of the common field of view.

18. The optical system according to claim 1, wherein the second infrared sensor is a second focal plane array and the second optical module further comprises second imaging optics to form an image on the second focal plane array of the common field of view.

19. The optical system according to claim 1, wherein the second infrared sensor comprises a two dimensional array of isolated sensors arranged in an insect eye configuration wherein each said sensor is associated with a collecting non imaging optics.

* * * * *